US012288953B2

(12) United States Patent
Yang et al.

(10) Patent No.: US 12,288,953 B2
(45) Date of Patent: Apr. 29, 2025

(54) CONNECTION ASSEMBLY, CONNECTOR, AND CONNECTOR ASSEMBLY

(71) Applicant: Tyco Electronics (Shanghai) Co., Ltd., Shanghai (CN)

(72) Inventors: Yuchen Yang, Shanghai (CN); Xiao (Nichee) Zhou, Shanghai (CN)

(73) Assignee: Tyco Electronics (Shanghai) Co., Ltd., Shanghai (CN)

(*) Notice: Subject to any disclaimer, the term of this patent is extended or adjusted under 35 U.S.C. 154(b) by 395 days.

(21) Appl. No.: 17/861,292

(22) Filed: Jul. 11, 2022

(65) Prior Publication Data

US 2023/0028765 A1 Jan. 26, 2023

(30) Foreign Application Priority Data

Jul. 20, 2021 (CN) ........................ 202110820871.8

(51) Int. Cl.

| | |
|---|---|
| ***H01R 13/621*** | (2006.01) |
| ***H01R 4/34*** | (2006.01) |
| ***H01R 13/52*** | (2006.01) |
| ***H01R 13/53*** | (2006.01) |

(52) U.S. Cl.

CPC ........... *H01R 4/34* (2013.01); *H01R 13/5202* (2013.01); *H01R 13/53* (2013.01)

(58) Field of Classification Search

CPC ........................................................ H01R 4/34

See application file for complete search history.

(56) References Cited

U.S. PATENT DOCUMENTS

| | | | | |
|---|---|---|---|---|
| 3,836,941 A * | 9/1974 | Izraeli | .................... | H01R 4/363 439/810 |
| 9,929,477 B2 * | 3/2018 | Beiler | .................. | F16B 31/021 |
| 2023/0028765 A1 * | 1/2023 | Yang | ..................... | H01R 4/305 |
| 2023/0291150 A1 * | 9/2023 | Yang | ................... | H01R 13/701 |

FOREIGN PATENT DOCUMENTS

| | | |
|---|---|---|
| CN | 206650178 U | 11/2017 |
| DE | 8520278 U1 | 9/1985 |
| EP | 0822614 B1 | 5/1998 |

OTHER PUBLICATIONS

European Extended Search Report for EP Application No. 22185590.1, dated Dec. 7, 2022.

* cited by examiner

*Primary Examiner* — Neil Abrams
(74) *Attorney, Agent, or Firm* — Potomac Law Group, PLLC

(57) ABSTRACT

A connection assembly, a connector and a connector assembly are disclosed. The connection assembly is used to connect a high-voltage cable and comprises: a threaded fastener for fixedly connecting the high-voltage cable to a mating connection part, the threaded fastener comprising an insulation member; and a conductive plug connected with the insulation member to allow the threaded fastener to be tightened or loosened by rotating the conductive plug. In the present invention, the conductive plug arranged in the mounting hole of the conductive housing can realize the electromagnetic shielding function, and the elastic sealing sleeve sleeved on the conductive plug seals the gap between the conductive plug and the inner wall of the mounting hole and can realize the waterproof function. The insulation member serves to electrically isolate the threaded connecting member from the high voltage cable.

14 Claims, 10 Drawing Sheets

CONNECTION ASSEMBLY, CONNECTOR, AND CONNECTOR ASSEMBLY

CROSS-REFERENCE TO RELATED APPLICATION

This application claims the benefit of Chinese Patent Application No. 2021108208718 filed on Jul. 20, 2021 in the State Intellectual Property Office of China, the whole disclosure of which is incorporated herein by reference.

BACKGROUND OF THE INVENTION

Field of the Invention

The present invention relates to a connection assembly, a connector including the connection assembly, and a connector assembly including the connector.

Description of the Related Art

In the prior art, in order to realize the rapid electrical connection of the high-voltage electrical circuit in the automobile, a connector is required, which can quickly realize the electrical connection between the high-voltage cable and the bus bar. The connector is internally provided with a terminal electrically connected with the high-voltage cable and the bus bar. Generally, the terminal is connected to the high-voltage cable through a bolt. In order to operate the bolt, a mounting hole needs to be formed on the housing of the connector so that an external tool can enter into the housing through the mounting hole to operate the bolt.

However, in the prior art, the mounting hole is usually not blocked and is in an open state, resulting in the connector having no waterproof and electromagnetic shielding functions. In order to realize waterproof and electromagnetic shielding, it is necessary to set a metal cover on the housing to close and seal the mounting hole. However, this will lead to the complexity of the housing and increase the production cost and operation difficulty of the connector.

SUMMARY OF THE INVENTION

The present invention has been made to overcome or alleviate at least one aspect of the above mentioned disadvantages.

According to an aspect of the present invention, there is provided a connection assembly for connecting a high-voltage cable. The connection assembly comprises: a threaded fastener for fixedly connecting the high-voltage cable to a mating connection part, the threaded fastener comprising an insulation member; and a conductive plug connected with the insulation member to allow the threaded fastener to be tightened or loosened by rotating the conductive plug.

According to an exemplary embodiment of the present invention, the threaded fastener comprises a conductive threaded connecting member; the insulation member is engaged between the conductive plug and the threaded connecting member and electrically isolating the conductive plug from the threaded connecting member.

According to another exemplary embodiment of the present invention, the insulation member comprises a circumferential insulation part, which is arranged around the conductive plug to increase a creepage distance between the threaded connecting member and the conductive plug.

According to another exemplary embodiment of the present invention, the insulation member is simultaneously formed on the threaded connecting member and the conductive plug; or the insulation member is formed separately from the threaded connecting member and the conductive plug and is sleeved on the threaded connecting member and the conductive plug; or the insulation member is formed on one of the threaded connecting member and the conductive plug and sleeved on the other of the threaded connecting member and the conductive plug.

According to another exemplary embodiment of the present invention, the insulation member and the conductive plug are separately molded and sleeved on the conductive plug; an annular groove is formed on one of the inner wall of the insulation member and the outer wall of the conductive plug, and an annular protrusion suitable for engagement with the annular groove is formed on the other.

According to another exemplary embodiment of the present invention, the insulation member further comprises an intermediate convex part, and the circumferential insulation part surrounds the intermediate convex part and is connected to the intermediate convex part, the conductive plug is engaged between the circumferential insulation part and the intermediate convex part of the insulation member, so as to prevent the conductive plug from being rotated with respect to the insulation member, the threaded connecting member is engaged in the intermediate convex part of the insulation member, so as to prevent the threaded connecting member from being rotated with respect to the insulation member.

According to another exemplary embodiment of the present invention, the threaded connecting member is a bolt, and the head of the bolt is engaged into the insulation member; or the threaded connecting member is a nut, and the nut is engaged into the insulation member.

According to another exemplary embodiment of the present invention, the threaded connecting member is a bolt, and the head of the bolt is engaged into the insulation member; and the connection assembly further comprises an insulation cap which is sleeved on the end of the bolt opposite to the head to prevent the end of the bolt from being contacted by a finger.

According to another exemplary embodiment of the present invention, a blind slot hole is formed in the outer end of the conductive plug, and the blind slot hole is used to engage with an external tool for driving the conductive plug to rotate.

According to another exemplary embodiment of the present invention, the connection assembly further comprises an elastic sealing sleeve sleeved on the conductive plug to seal a gap between the conductive plug and a conductive housing.

According to another aspect of the present invention, there is provided a connector comprising: a conductive housing having a mounting hole; an inner insulator mounted in the conductive housing; a terminal provided on the inner insulator; a mating threaded connecting member provided on the inner insulator; and the above connection assembly. The connection assembly enters the conductive housing through the mounting hole and is connected with the mating threaded connecting member for electrically connecting the terminal to a high-voltage cable.

According to an exemplary embodiment of the present invention, the conductive plug of the connection assembly is arranged in the mounting hole for blocking the mounting hole; the elastic sealing sleeve of the connection assembly is sleeved on the conductive plug to seal a gap between the conductive plug and the conductive housing.

According to another exemplary embodiment of the present invention, the size of the gap between the conductive plug and the conductive housing is set to prevent electromagnetic waves from being leaked to the outside of the conductive housing through the gap.

According to another exemplary embodiment of the present invention, the elastic sealing sleeve is an elastic conductive seal made of an elastic conductive material, and the conductive plug is electrically connected to the conductive housing through the elastic sealing sleeve.

According to another exemplary embodiment of the present invention, a slot is formed on the terminal, and the mating threaded connecting member is positioned in the slot of the terminal to prevent the mating threaded connecting member from being rotated with respect to the terminal.

According to another exemplary embodiment of the present invention, the conductive plug comprises a columnar body part, and the elastic sealing sleeve comprises a cylindrical body part; the cylindrical body part is sleeved on the columnar body part and is radially compressed between the columnar body part of the conductive plug and the inner wall of the mounting hole to seal the gap between them.

According to another exemplary embodiment of the present invention, the conductive plug further comprises an annular brim part formed at the outer end of the columnar body part, and the elastic sealing sleeve further comprises a radially extending annular lip part formed at one end of the cylindrical body part; the annular lip part is axially compressed between the annular brim part of the conductive plug and the outer surface of the conductive housing to seal the gap between them.

According to another aspect of the present invention, there is provided a connector assembly comprising: the above connector; and a cable assembly comprising a cable and a cable terminal connected with the cable. The cable terminal is arranged in the conductive housing and is electrically connected with the terminal of the connector.

In the above exemplary embodiments according to the present invention, the conductive plug arranged in the mounting hole can realize the electromagnetic shielding function, and the elastic sealing sleeve sleeved on the conductive plug can seal the gap between the conductive plug and the inner wall of the mounting hole, so as to realize the waterproof function.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
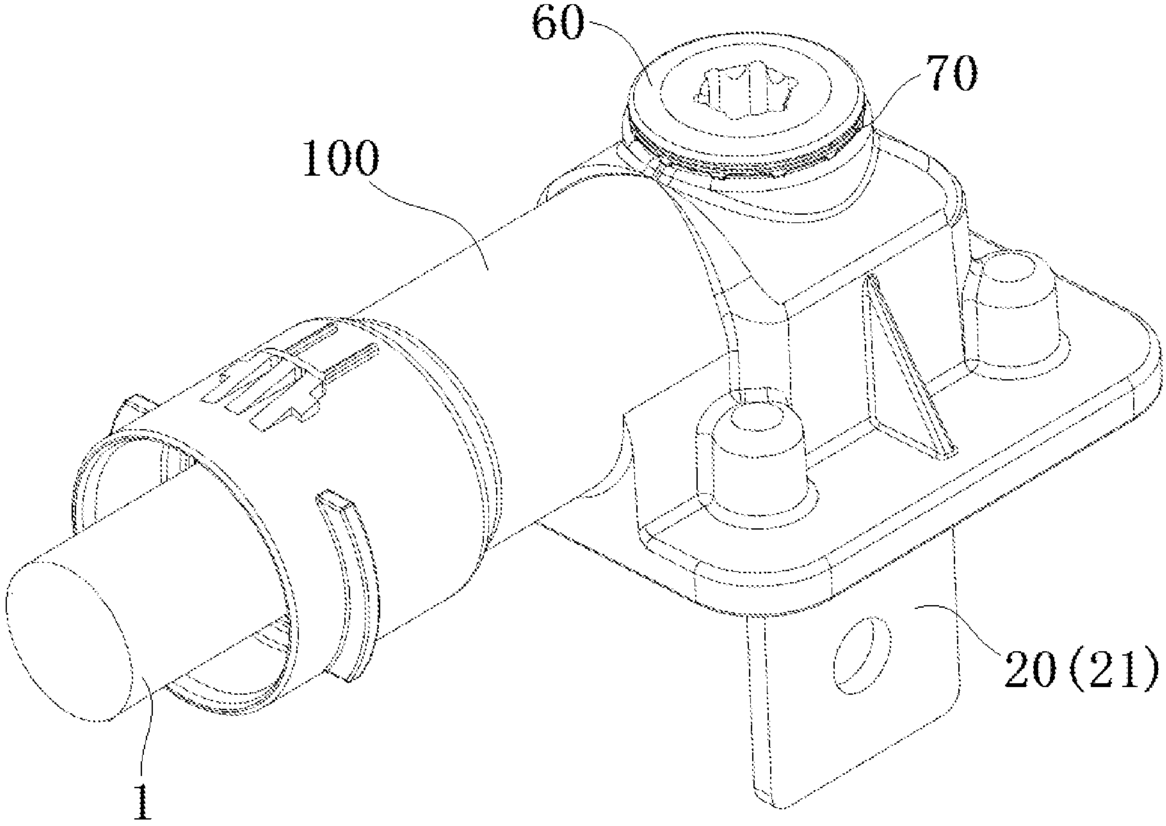
FIG. 1 shows an illustrative perspective view of a connector according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a connection assembly for connecting a high-voltage cable, the connection assembly comprises: a threaded fastener for fixedly connecting the high-voltage cable to the mating connection part, wherein the threaded fastener comprises an insulation member; and a conductive plug connected with the insulation member so that the threaded fastener can be tightened or loosened by rotating the conductive plug.

According to another general technical concept of the present invention, there is provided a connector, which comprises: a conductive housing with a mounting hole; an inner insulator installed in the conductive housing; a terminal arranged on the inner insulator; a mating thread connector arranged on the inner insulator; and the connection assembly, which enters the conductive housing through the mounting hole and is connected with the mating threaded connecting member for electrically connecting the terminal to the high-voltage cable.

Figure 2:
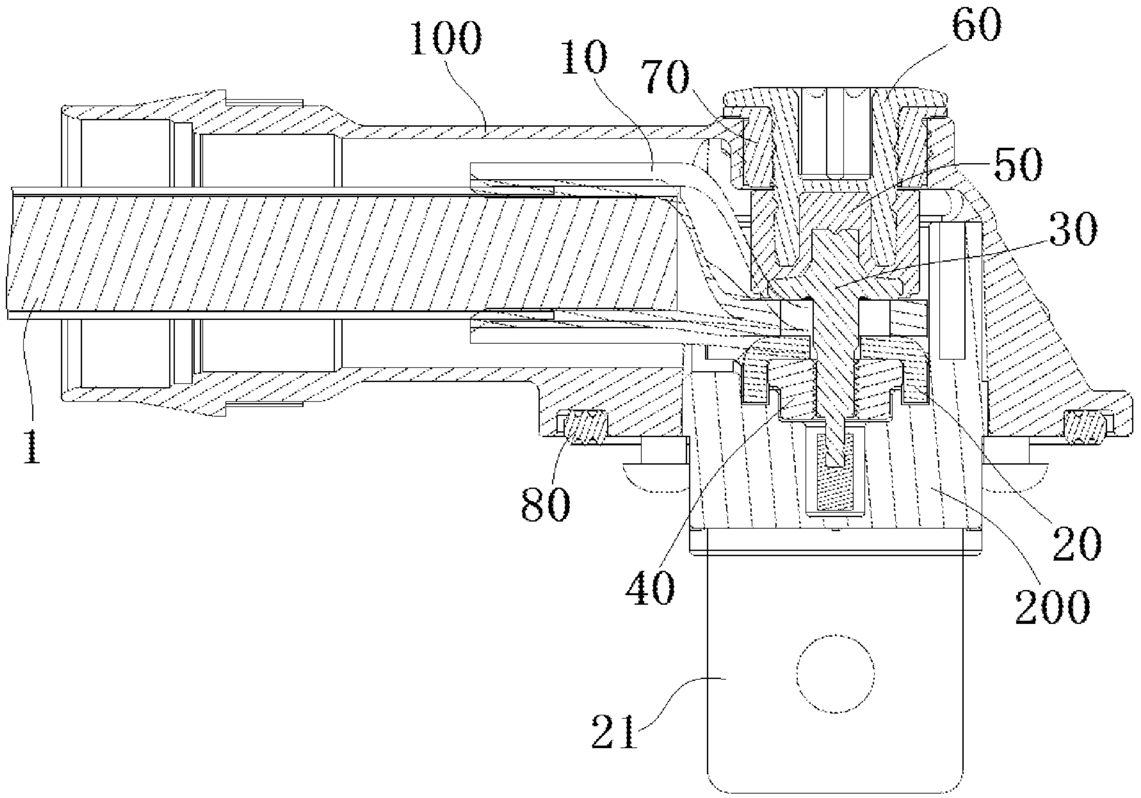
FIG. 2 shows a sectional view of the connector shown in FIG. 1.
Figure 3:
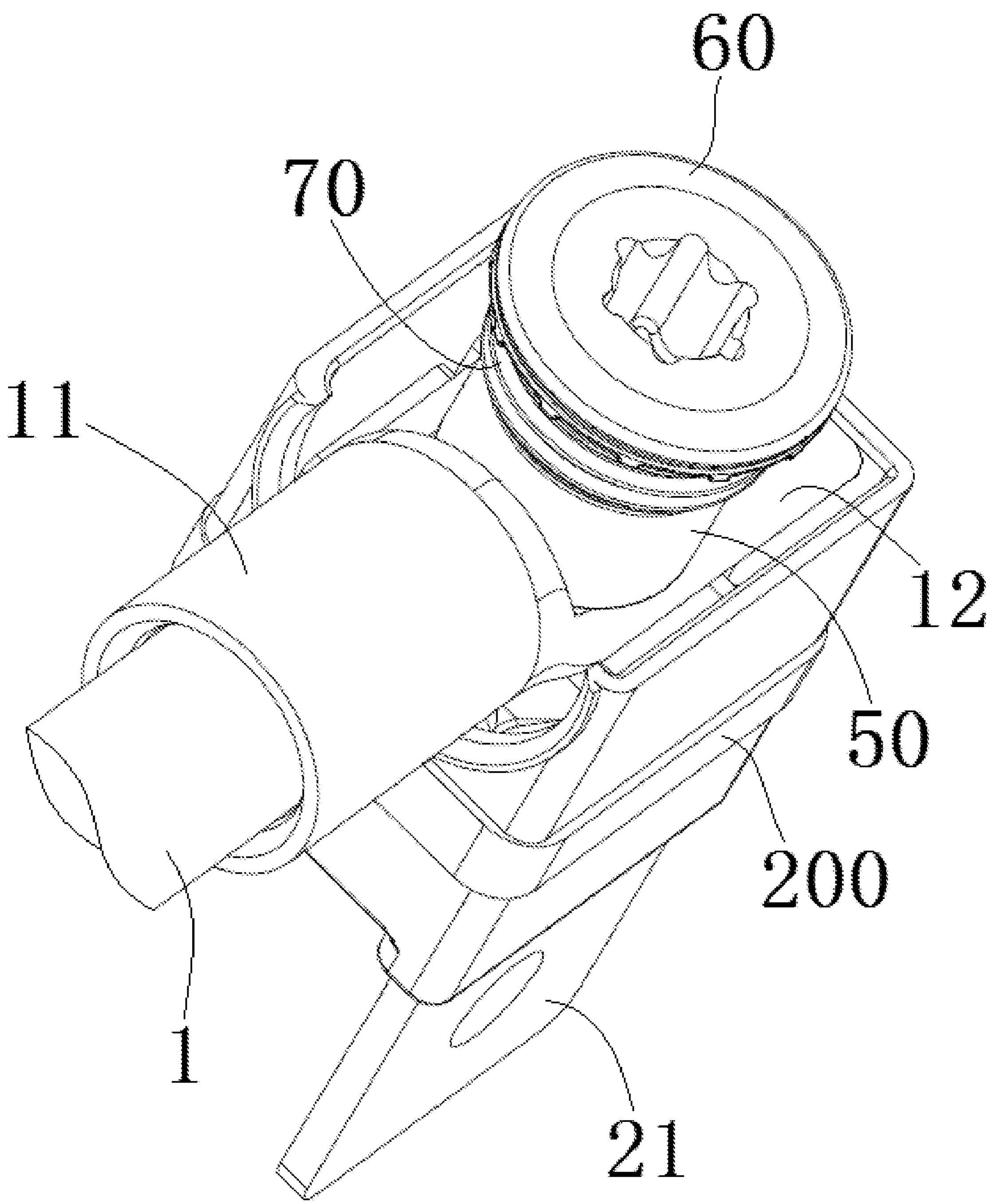
FIG. 3 shows an illustrative perspective view of a connector according to an exemplary embodiment of the present invention, wherein the conductive housing is removed.
Figure 7:
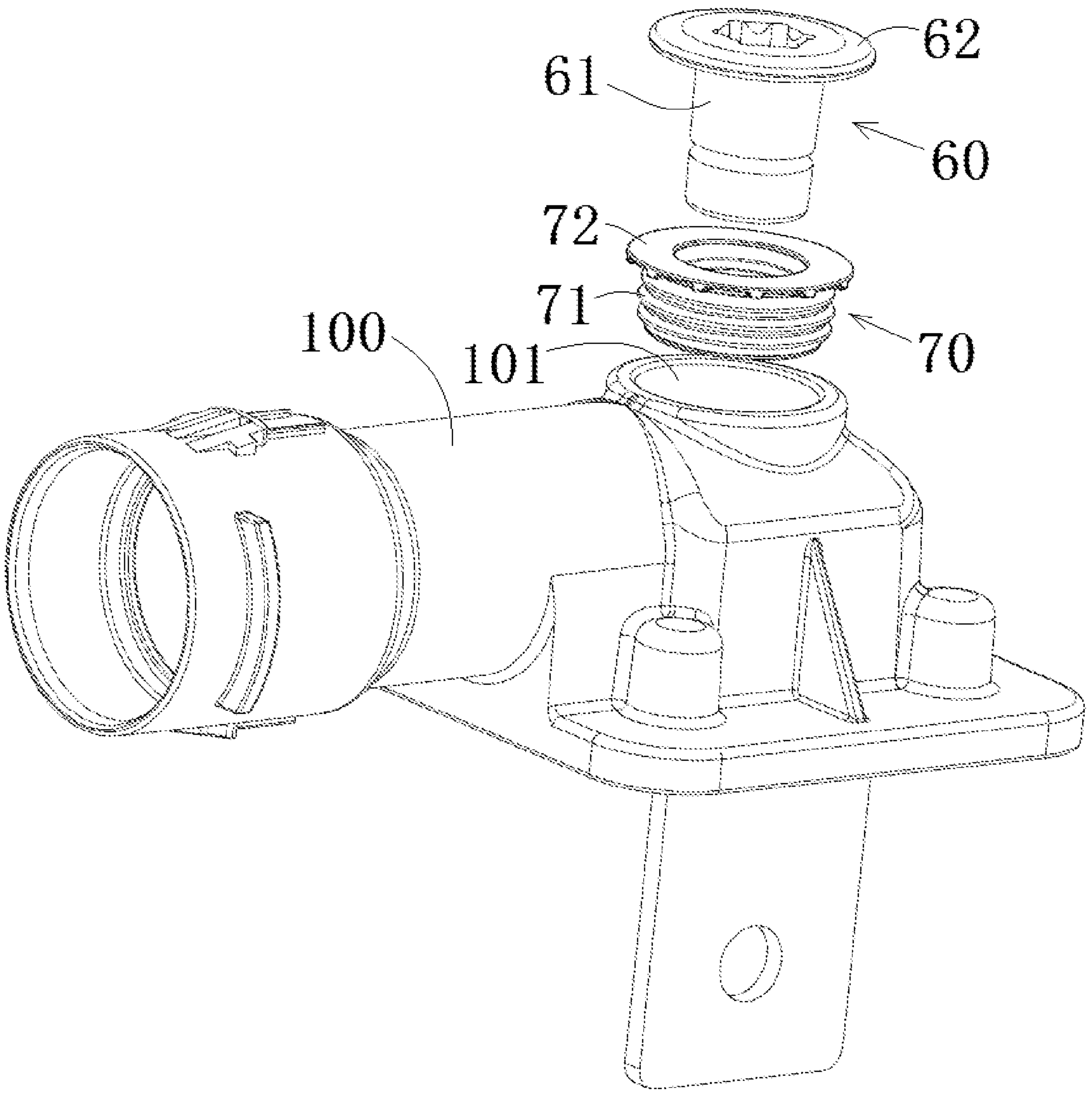
FIG. 7 shows an exploded schematic diagram of a connector according to an exemplary embodiment of the present invention.

FIG. 1 shows an illustrative perspective view of a connector according to an exemplary embodiment of the present invention. FIG. 2 shows a sectional view of the connector shown in FIG. 1. FIG. 3 shows an illustrative perspective view of a connector according to an exemplary embodiment of the present invention, wherein the conductive housing 100 is removed. FIG. 7 shows an exploded schematic diagram of a connector according to an exemplary embodiment of the present invention.

As shown in FIGS. 1-3 and FIG. 7, in the illustrated embodiment, the connector mainly includes: a conductive housing 100, an internal insulator 200, a terminal 20, a threaded connecting member 30, a mating threaded connecting member 40, a conductive plug 60, an elastic sealing sleeve 70 and an insulation member 50. The conductive housing 100 has a mounting hole 101. The inner insulator 200 is mounted in the conductive housing 100. The terminal

20 is provided on the inner insulator 200. The inner insulator 200 is used to hold the terminal 20 and electrically isolate the terminal 20 from the conductive housing 100.

Figure 8:
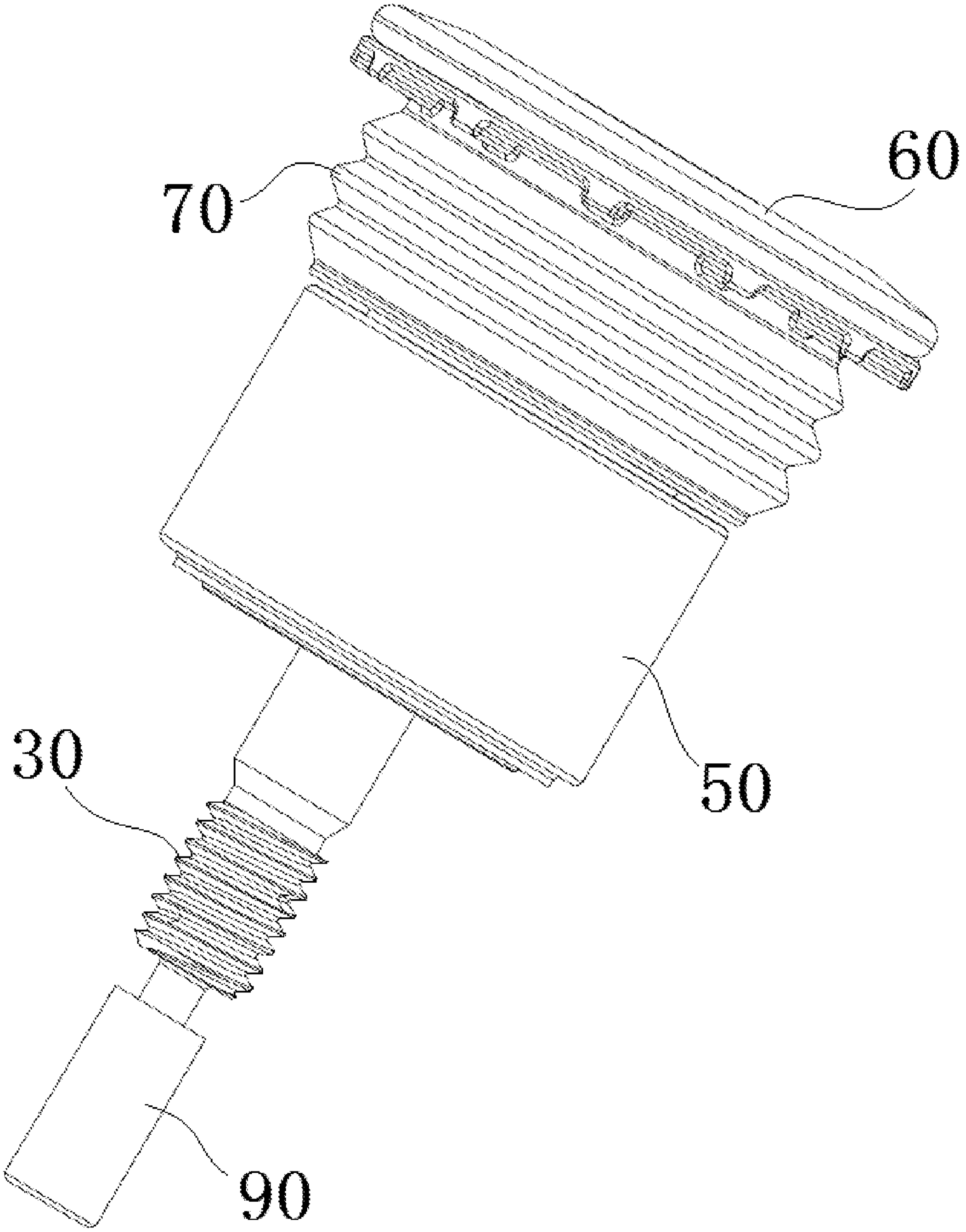
FIG. 8 shows the assembly diagram of the connection assembly in the connector shown in FIG. 1.
Figure 9:
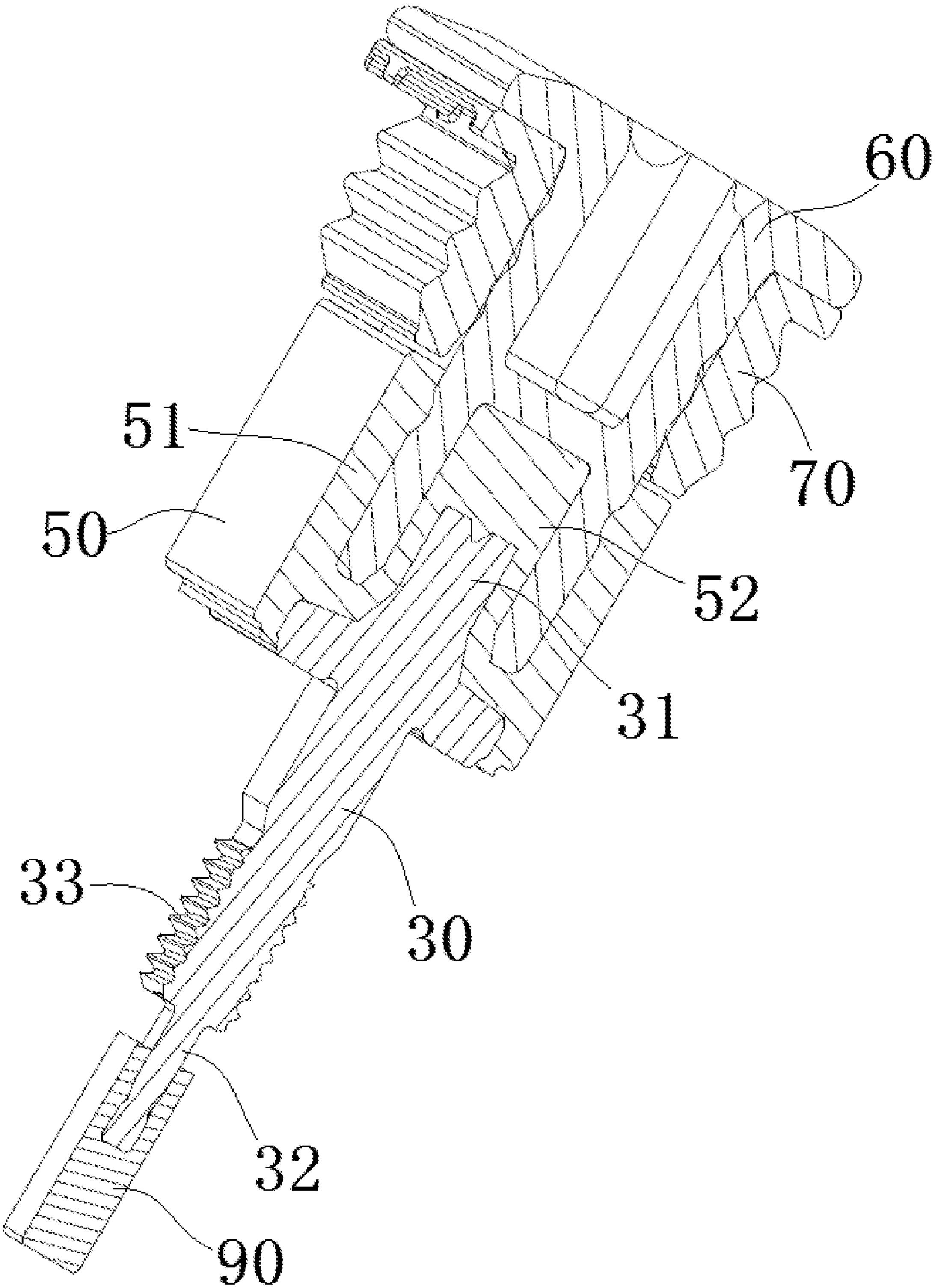
FIG. 9 shows a sectional view of the connection assembly shown in FIG. 8.
Figure 10:
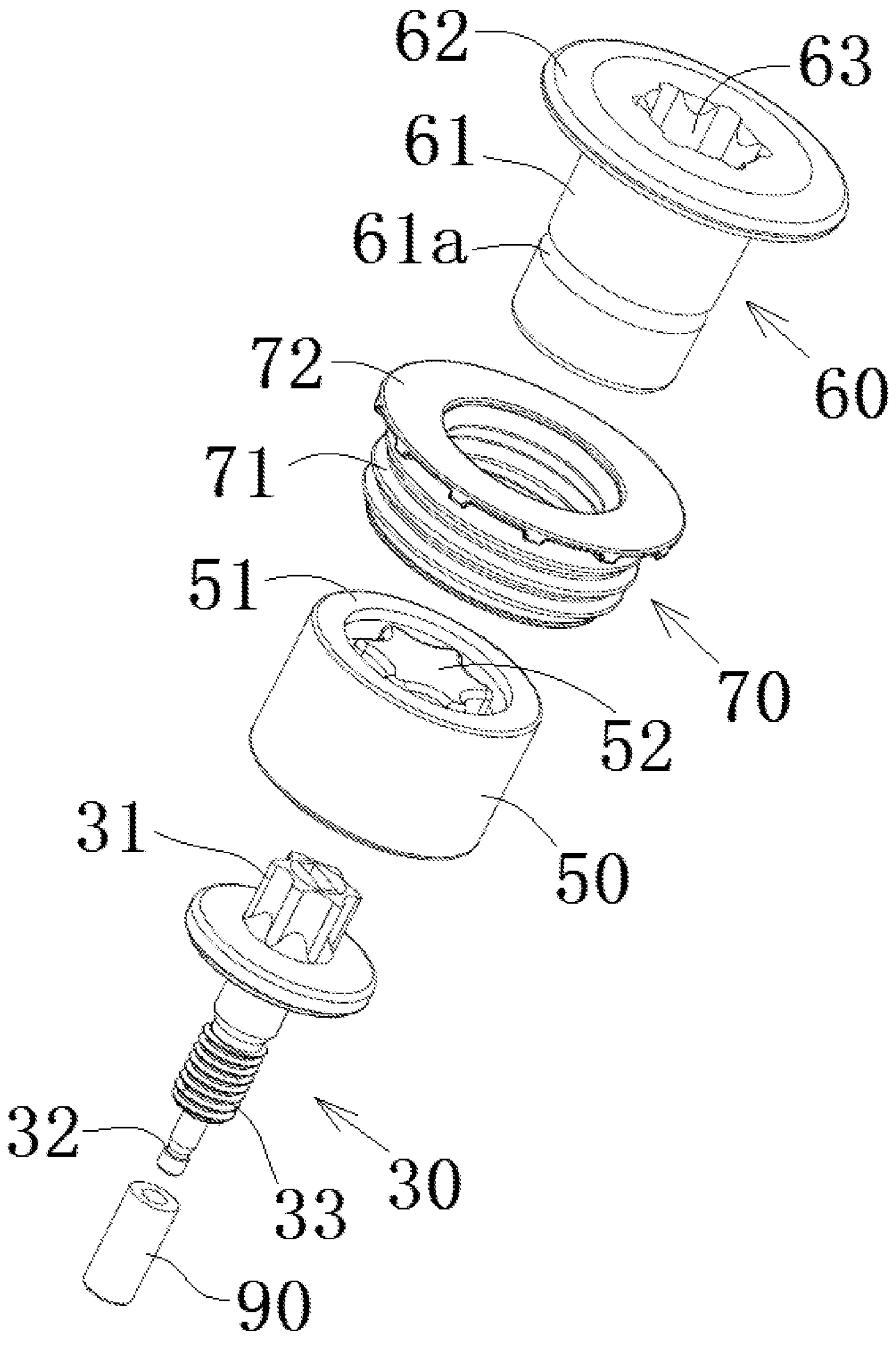
FIG. 10 shows an exploded schematic of the connection assembly shown in FIG. 8.

FIG. 8 shows the assembly diagram of the connection assembly in the connector shown in FIG. 1; FIG. 9 shows a sectional view of the connection assembly shown in FIG. 8; FIG. 10 shows an exploded schematic of the connection assembly shown in FIG. 8.

As shown in FIGS. 1-3 and FIGS. 7-10, in the illustrated embodiment, the threaded connecting member 30, the conductive plug 60 and the insulation member 50 form a connection assembly. The connection assembly enters the conductive housing 100 through the mounting hole 101 of the conductive housing 100. The threaded connecting member 30 of the connection assembly is threaded with the mating threaded connecting member 40 to connect the terminal 20 to the cable terminal 10. In the illustrated embodiment, one end 11 of the cable terminal 10 is crimped to the conductor of the high voltage cable 1, and the other end 12 is connected to one end 22 of the terminal 20 of the connector. In this way, the terminal 20 of the connector is connected to the high voltage cable 1. Although not shown, the connector also includes a shield connecting member installed in the conductive housing 100 for electrically connecting the shielding layer of the high voltage cable 1 to the conductive housing 100. For example, the aforementioned shield connecting member may be a conductive ring sheathed on the shielding layer of the high-voltage cable 1, the conductive ring has a conductive spring, and the conductive spring is in contact with the inner wall surface of the conductive housing 100. If there is a waterproof requirement, the connector also includes a sealing ring arranged between the conductive housing 100 and the high-voltage cable to seal the mating interface between them.

As shown in FIGS. 1-3 and FIGS. 7-10, in the illustrated embodiment, the conductive plug 60 is arranged in the mounting hole 101 to block the mounting hole 101 to realize the electromagnetic shielding function. The elastic sealing sleeve 70 is sleeved on the conductive plug 60 and seals the gap between the conductive plug 60 and the conductive housing 100 to achieve the waterproof function. Please note that if the installation environment has no waterproof requirements, the elastic sealing sleeve 70 can be omitted. The insulation member 50 is engaged between the conductive plug 60 and the threaded connecting member 30 and electrically isolates the conductive plug 60 from the threaded connecting member 30, so that the threaded connecting members 30, 40 can be tightened or loosened by rotating the conductive plug 60. In the illustrated embodiment, the threaded connecting member 30 is conductive, and the insulation member 50 can prevent the operator from contacting the conductive threaded connecting member 30.

As shown in FIGS. 1-3 and 7, in the illustrated embodiment, in order to realize the electromagnetic shielding function, the size of the gap between the conductive plug 60 and the conductive housing 100 is set to prevent electromagnetic waves from being leaked to the outside of the conductive housing 100 through the gap. The size of the gap between the conductive plug 60 and the conductive housing 100 includes two sizes, one is the width of the gap, and the other is the length of the gap. The two sizes can be reasonably set according to the wavelength of the electromagnetic wave.

As shown in FIGS. 1-3 and 7, in the illustrated embodiment, the elastic sealing sleeve 70 may be made of a common elastic material, such as rubber. The elastic sealing sleeve 70 usually only has a waterproof function and has no conductive function. However, the present invention is not limited to this. For example, in an exemplary embodiment of the present invention, the elastic sealing sleeve 70 may be an elastic conductive seal made of an elastic conductive material, so that the conductive plug 60 can be electrically connected to the conductive housing 100 via the elastic sealing sleeve 70. In this way, the electromagnetic shielding effect of the connector can be further improved.

As shown in FIG. 2 and FIGS. 8-10, in an exemplary embodiment of the present invention, the insulation member 50 can be simultaneously molded on the threaded connecting member 30 and the conductive plug 60 by injection molding. In this way, the insulation member 50 can be engaged to the threaded connecting member 30 and the conductive plug 60 at the same time. However, the present invention is not limited to this. For example, in another exemplary embodiment of the present invention, the insulation member 50 may be formed separately from the threaded connecting member 30 and the conductive plug 60 and sleeved on the threaded connecting member 30 and the conductive plug 60. Alternatively, in another exemplary embodiment of the present invention, the insulation member 50 may be formed on one of the threaded connecting member 30 and the conductive plug 60 and sheathed on the other of the threaded connecting member 30 and the conductive plug 60.

As shown in FIG. 2 and FIG. 8-10, in the illustrated embodiment, the insulation member 50 is formed separately from the conductive plug 60 and sheathed on the conductive plug 60. An annular groove 61*a* is formed on one of the inner wall of the insulation member 50 and the outer wall of the conductive plug 60, and an annular protrusion suitable for engagement with the annular groove 61*a* is formed on the other. When the insulation member 50 is sleeved on the conductive plug 60, the annular groove 61*a* is engaged with the annular protrusion to prevent the conductive plug 60 from being axially separated from the insulation member 50.

As shown in FIG. 2 and FIGS. 8-10, in the illustrated embodiment, the insulation member 50 includes a circumferential insulation part 51 and an intermediate convex part 52. The intermediate convex part 52 is located in the circumferential insulation part 51 and connected to the circumferential insulation part 51. The conductive plug 60 is engaged between the circumferential insulation part 51 and the intermediate convex part 52 of the insulation member 50 so that the conductive plug 60 cannot be rotated with respect to the insulation member 50. The threaded connecting member 30 is engaged in the intermediate convex part 52 of the insulation member 50 so that the threaded connecting member 30 cannot be rotated with respect to the insulation member 50.

As shown in FIG. 2 and FIGS. 8-10, in the illustrated embodiment, the insulation member 50 is molded on the threaded connecting member 30. The insulation member 50 and the threaded connecting member 30 together form a threaded fastener.

As shown in FIG. 2 and FIG. 8-10, in the illustrated embodiment, the threaded connecting member 30 is a bolt, the mating threaded connecting member 40 is a nut, and an external thread 33 connected with the nut thread is formed on the bolt. The head 31 of the bolt is engaged in the insulation member 50, and the nut is fixed to the terminal 20. The bolt passes through the cable terminal 10 and the connector terminal 20 and is threaded with the nut to connect the cable terminal 10 and the connector terminal 20 together.

In the illustrated embodiment, the bolt can be rotated by rotating the conductive plug 60 so that the bolt can be tightened or loosened.

However, please note that the present invention is not limited to the illustrated embodiment. For example, in another exemplary embodiment of the present invention, the threaded connecting member 30 is a nut and the mating threaded connecting member 40 is a bolt. The nut is engaged in the insulation member 50, and the head 31 of the bolt is fixed to the terminal 20. The bolt passes through the cable terminal 10 and the connector terminal 20 and is threaded with the nut to connect the cable terminal 10 and the connector terminal 20 together.

As shown in FIG. 2 and FIGS. 8-10, in the illustrated embodiment, the connector also includes an insulation cap 90, which is sleeved on the end 32 of the bolt 30 opposite to the head 31 to prevent the operator from contacting the end 32 of the bolt 30. In this way, electric shock accidents can be prevented.

As shown in FIG. 2 and FIGS. 8-10, in the illustrated embodiment, a blind slot hole 63 is formed on the outer end of the conductive plug 60, which is used to engage with an external tool (not shown), so that the conductive plug 60 can be driven to rotate by the external tool. In this way, the threaded connecting member 30 can be tightened or loosened.

As shown in FIGS. 1-3 and 8-10, in the illustrated embodiment, the conductive plug 60 includes a columnar body part 61, and the elastic sealing sleeve 70 includes a cylindrical body part 71. The cylindrical main body 71 is sheathed on the columnar body part 61 and is radially compressed between the columnar body part 61 of the conductive plug 60 and the inner wall of the mounting hole 101 to seal the gap between them.

As shown in FIGS. 1-3 and FIGS. 8-10, in the illustrated embodiment, the conductive plug 60 also includes an annular brim part 62 formed at the outer end of the columnar body part 61, and the elastic sealing sleeve 70 also includes an annular lip part 72 formed at one end of the cylindrical body portion 71 and extending radially. The annular lip part 72 of the elastic sealing sleeve 70 is axially compressed between the annular brim part 62 of the conductive plug 60 and the outer surface of the conductive housing 100 to seal the gap between them.

As shown in FIGS. 1-3 and 8-10, in the illustrated embodiment, the connector also includes an elastic sealing ring 80 arranged at the bottom of the conductive housing 100. When the conductive housing 100 of the connector is installed on a housing of an electrical equipment, the elastic sealing ring 80 is compressed between the conductive housing 100 of the connector and the housing of the electrical equipment to seal the mating interface between them.

Figure 4:
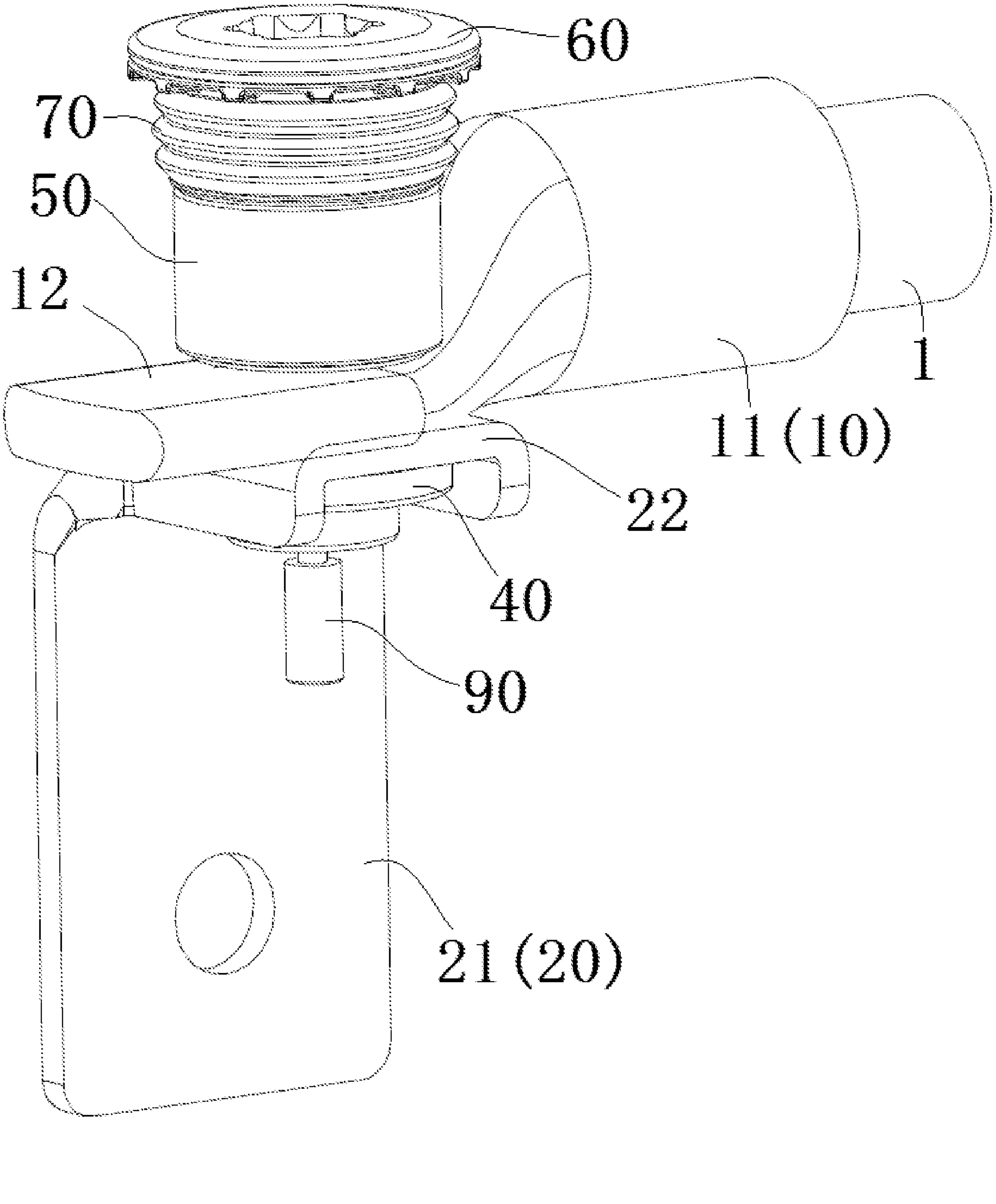
FIG. 4 shows an illustrative perspective view of the connector shown in FIG. 3 when viewed from one direction, wherein the inner insulator is removed.
Figure 5:
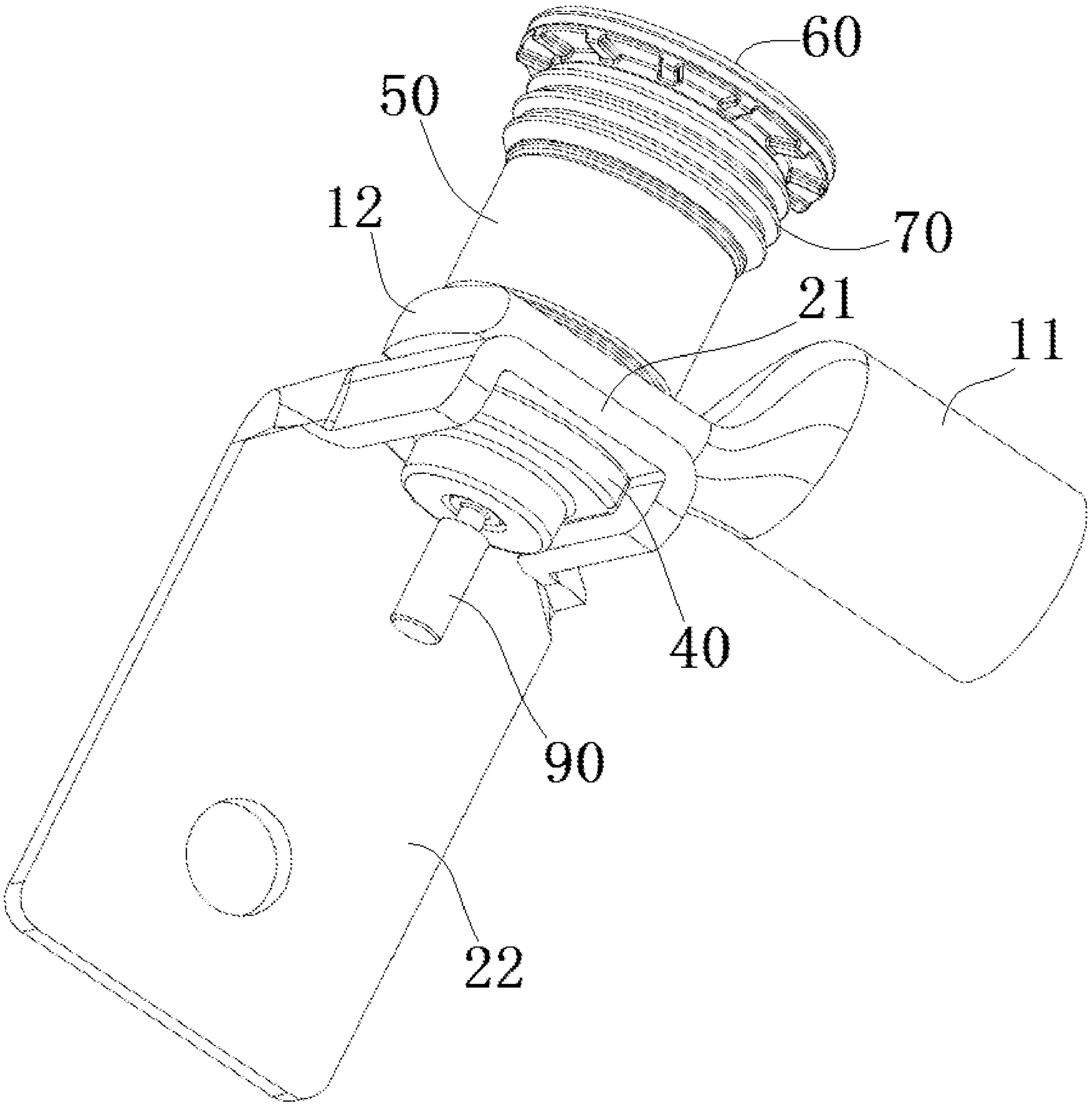
FIG. 5 shows an illustrative perspective view of the connector shown in FIG. 3 when viewed from another direction, wherein the inner insulator is removed.
Figure 6:
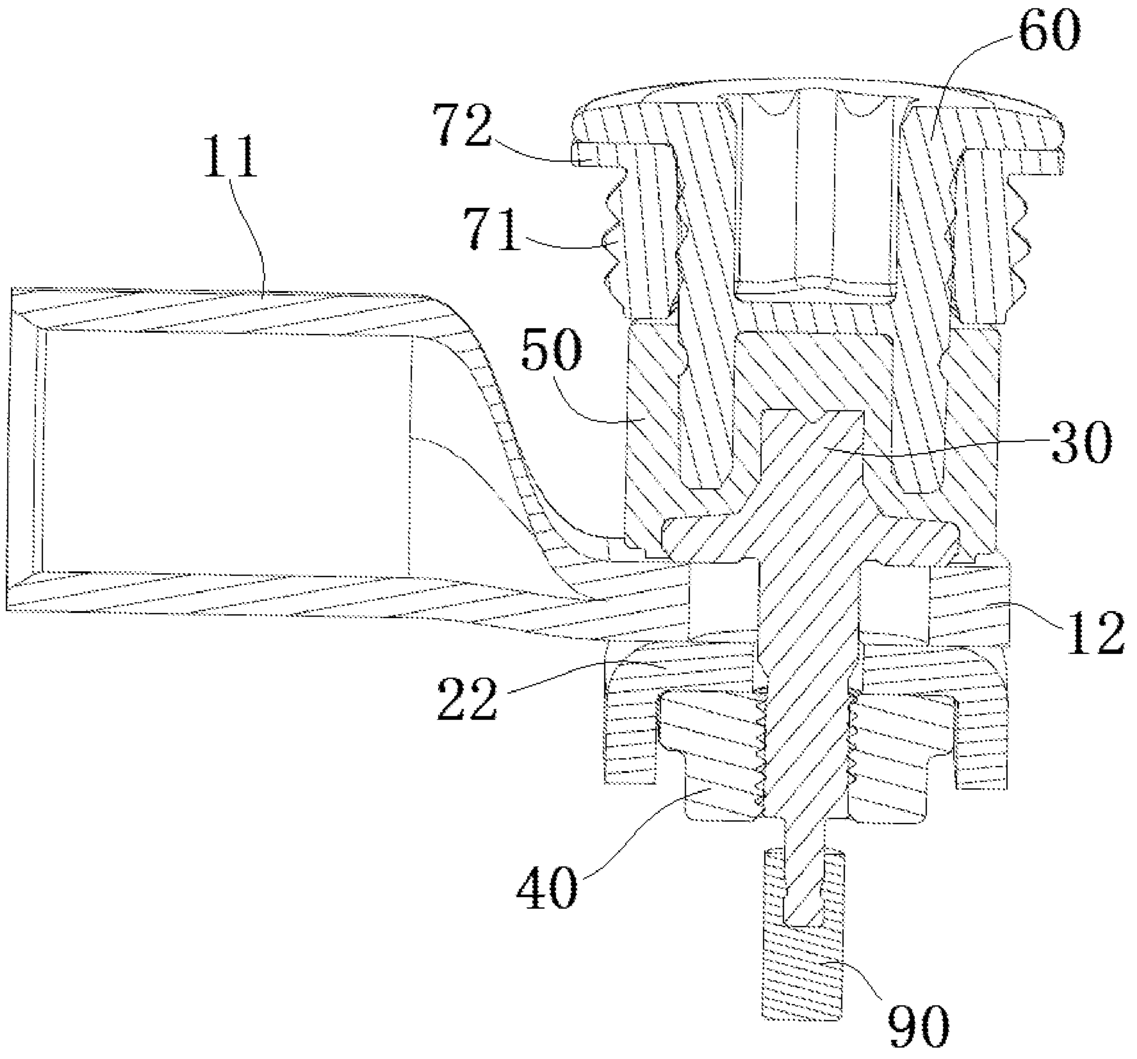
FIG. 6 shows a sectional view of the connector shown in FIG. 4 and FIG. 5.

FIG. 4 shows a three-dimensional schematic view of the connector shown in FIG. 3 when viewed from one direction, wherein the inner insulator 200 is removed. FIG. 5 shows a schematic stereoscopic view of the connector shown in FIG. 3 when viewed from another direction, wherein the inner insulator 200 is removed. FIG. 6 shows a sectional view of the connector shown in FIGS. 4 and 5.

As shown in FIGS. 4 to 6, in the illustrated embodiment, the terminal 20 of the connector is suitable for electrical connection with a bus bar (not shown). One end 11 of the cable terminal 10 is cylindrical and crimped to the high-voltage cable 1. The other end 12 of the cable terminal 10 is electrically connected with one end 22 of the connector terminal 20. The other end 21 of the terminal 20 of the connector is plate-shaped and suitable for connection to the bus bar. In the illustrated embodiment, the other end 12 of the cable terminal 10 and one end 22 of the connector terminal 20 are stacked together and can be connected together through the threaded connecting member 30 and the mating threaded connecting member 40.

As shown in FIGS. 4 to 6, in the illustrated embodiment, a slot is formed at one end 22 of the terminal 20 of the connector, and the mating threaded connecting member 40 is positioned in the slot at one end 22 of the terminal 20 so that the mating threaded connecting member 40 cannot be rotated relative to the terminal 20.

As shown in FIGS. 1 to 3, in an exemplary embodiment of the present invention, a connector assembly is also disclosed. The connector assembly mainly includes the above connector and cable assembly. The cable assembly includes a high-voltage cable 1 and a cable terminal 10 electrically connected to a conductor of the high-voltage cable 1. The terminal 20 of the connector is electrically connected with the cable terminal 10.

As shown in FIG. 2 and FIGS. 8-10, in an exemplary embodiment of the present invention, a connection assembly for connecting a high-voltage cable 1 is also disclosed. The connection assembly mainly includes: a threaded fastener 30, 50 and a conductive plug 60. The threaded fastener 30 and 50 is used to fixedly connect the high-voltage cable 1 to the mating connection part (for example, terminal 20 in the figure). The threaded fastener 30 and 50 includes an insulation member 50 and a conductive threaded connecting member 30. The conductive plug 60 is connected with the insulation member 50 so that the threaded fastener 30, 50 can be tightened or loosened by rotating the conductive plug 50. In the illustrated embodiment, the insulation member 50 is engaged between the conductive plug 60 and the threaded connecting member 30 and electrically isolates the conductive plug 60 from the threaded connecting member 30.

As shown in FIG. 2 and FIGS. 8-10, in the illustrated embodiment, the insulation member 50 includes a cylindrical circumferential insulation part 51, which is arranged around the conductive plug 60 and is suitable to be sheathed on the conductive plug 60 to increase the creepage distance between the threaded connecting member 30 and the conductive plug 60. In the illustrated embodiment, the circumferential insulation part 51 also axially limits the axial position of the elastic seal 70 to prevent the elastic seal 70 from being moved downward.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention claimed is:

1. A connection assembly for connecting a high-voltage cable, the connection assembly comprising:
- a threaded fastener for fixedly connecting the high-voltage cable to a mating connection part, the threaded fastener comprising an insulation member and a conductive threaded connecting member; and
- a conductive plug connected with the insulation member to allow the threaded fastener to be tightened or loosened by rotating the conductive plug;
- the insulation member comprising a circumferential insulation part, which is arranged around the conductive plug to increase a creepage distance between the threaded connecting member and the conductive plug;
- the insulation member engaged between the conductive plug and the threaded connecting member and electrically isolating the conductive plug from the threaded connecting member.

2. The connection assembly according to claim 1, wherein
- the insulation member and the conductive plug are separately molded and sleeved on the conductive plug;
- an annular groove is formed on one of the inner wall of the insulation member and the outer wall of the conductive plug, and an annular protrusion suitable for engagement with the annular groove is formed on the other.

3. A connection assembly for connecting a high-voltage cable, the connection assembly comprising:
- a threaded fastener for fixedly connecting the high-voltage cable to a mating connection part, the threaded fastener comprising an insulation member;
- a conductive plug connected with the insulation member to allow the threaded fastener to be tightened or loosened by rotating the conductive plug;
- the insulation member further comprises an intermediate convex part, and the circumferential insulation part surrounds the intermediate convex part and is connected to the intermediate convex part,
- the conductive plug is engaged between the circumferential insulation part and the intermediate convex part of the insulation member, so as to prevent the conductive plug from being rotated with respect to the insulation member,
- the threaded connecting member is engaged in the intermediate convex part of the insulation member, so as to prevent the threaded connecting member from being rotated with respect to the insulation member.

4. The connection assembly according to claim 1, wherein
- the threaded connecting member is a bolt, and the head of the bolt is engaged into the insulation member; and
- the connection assembly further comprises an insulation cap which is sleeved on the end of the bolt opposite to the head to prevent the end of the bolt from being contacted by a finger.

5. The connection assembly according to claim 1, wherein
- a blind slot hole is formed in the outer end of the conductive plug, and the blind slot hole is used to engage with an external tool for driving the conductive plug to rotate.

6. The connection assembly according to claim 1, wherein
- an elastic sealing sleeve sleeved on the conductive plug to seal a gap between the conductive plug and a conductive housing.

7. A connector comprising:
- a conductive housing having a mounting hole;
- an inner insulator mounted in the conductive housing;
- a terminal provided on the inner insulator;
- a mating threaded connecting member provided on the inner insulator; and
- the connection assembly comprising:
  - a threaded fastener for fixedly connecting the high-voltage cable to a mating connection part, the threaded fastener comprising an insulation member;
  - a conductive plug connected with the insulation member to allow the threaded fastener to be tightened or loosened by rotating the conductive plug;
- wherein the connection assembly enters the conductive housing through the mounting hole and is connected with the mating threaded connecting member for electrically connecting the terminal to a high-voltage cable.

8. The connector according to claim 7, wherein
- the conductive plug of the connection assembly is arranged in the mounting hole for blocking the mounting hole;
- the elastic sealing sleeve of the connection assembly is sleeved on the conductive plug to seal a gap between the conductive plug and the conductive housing.

9. The connector according to claim 8, wherein
- the size of the gap between the conductive plug and the conductive housing is set to prevent electromagnetic waves from being leaked to the outside of the conductive housing through the gap.

10. The connector according to claim 8, wherein
- the elastic sealing sleeve is an elastic conductive seal made of an elastic conductive material, and the conductive plug is electrically connected to the conductive housing through the elastic sealing sleeve.

11. The connector according to claim 7, wherein
- a slot is formed on the terminal, and the mating threaded connecting member is positioned in the slot of the terminal to prevent the mating threaded connecting member from being rotated with respect to the terminal.

12. The connector according to claim 7, wherein
- the conductive plug comprises a columnar body part, and the elastic sealing sleeve comprises a cylindrical body part;
- the cylindrical body part is sleeved on the columnar body part and is radially compressed between the columnar body part of the conductive plug and the inner wall of the mounting hole to seal the gap between them.

13. The connector according to claim 12, wherein
- the conductive plug further comprises an annular brim part formed at the outer end of the columnar body part, and the elastic sealing sleeve further comprises a radially extending annular lip part formed at one end of the cylindrical body part;
- the annular lip part is axially compressed between the annular brim part of the conductive plug and the outer surface of the conductive housing to seal the gap between them.

14. A connector assembly comprising:
- the connector according to claim 7; and
- a cable assembly comprising a cable and a cable terminal connected with the cable;
- wherein the cable terminal is arranged in the conductive housing and is electrically connected with the terminal of the connector.

* * * * *